United States Patent
Tsirulnik et al.

(10) Patent No.: US 9,916,332 B2
(45) Date of Patent: Mar. 13, 2018

(54) DATASET CHART SCALING

(71) Applicant: Hewlett-Packard Development Company, L.P., Houston, TX (US)

(72) Inventors: Luba Tsirulnik, Yehud (IL); Gabriel Dayan, Yehud (IL); Elad Kadosh, Yehud (IL)

(73) Assignee: EntIT Software LLC, Sunnyvale, CA (US)

( * ) Notice: Subject to any disclaimer, the term of this patent is extended or adjusted under 35 U.S.C. 154(b) by 412 days.

(21) Appl. No.: 14/795,335

(22) Filed: Jul. 9, 2015

(65) Prior Publication Data

US 2017/0011072 A1    Jan. 12, 2017

(51) Int. Cl.
*G06F 17/30*    (2006.01)

(52) U.S. Cl.
CPC .. *G06F 17/30292* (2013.01); *G06F 17/30315* (2013.01); *G06F 17/30377* (2013.01)

(58) Field of Classification Search
CPC ......... G06F 17/30292; G06F 17/30377; G06F 17/30315
See application file for complete search history.

(56) References Cited

U.S. PATENT DOCUMENTS

| | | | |
|---|---|---|---|
| 7,991,672 B2 | 8/2011 | Crowder | |
| 8,502,822 B2 | 8/2013 | Rabin | |
| 8,600,718 B1 * | 12/2013 | Stepaniants | G06F 19/18 703/11 |
| 8,661,062 B1 * | 2/2014 | Jamail | H04L 63/1416 707/802 |
| 9,536,208 B1 * | 1/2017 | Kakde | G06N 99/005 |
| 2006/0164418 A1 | 7/2006 | Hao et al. | |
| 2011/0106589 A1 | 5/2011 | Blomberg et al. | |
| 2013/0152998 A1 * | 6/2013 | Herzig | F24J 2/38 136/246 |
| 2015/0101037 A1 * | 4/2015 | Yang | G06F 21/44 726/16 |
| 2015/0193376 A1 * | 7/2015 | Yeh | G06F 17/14 702/189 |
| 2016/0357903 A1 * | 12/2016 | Shendure | G06F 19/22 |
| 2016/0366547 A1 * | 12/2016 | Hodges | H04W 4/02 |

OTHER PUBLICATIONS

Spear, W. et al., An Approach to Creating Performance Visualizations in a Parallel Profile Analysis Tool, (Research Paper), Jul. 25, 2011, 10 Pages.
Stoffel, F. et al, Finding Anomalies in Time-series Using Visual Correlation for Interactive Root Cause Analysis, (Research Paper). Oct. 14, 2013, 8 Pages.

\* cited by examiner

*Primary Examiner* — Kris Mackes
*Assistant Examiner* — Tiffany Bui

(57) ABSTRACT

An example process for selecting chart scalings for plotting two time-series datasets includes determining a first log difference between a logarithm of a maximum value of a first dataset and a logarithm of a minimum value of the first dataset. The process also includes determining a second log difference between a logarithm of a maximum value of a second dataset and a logarithm of a minimum value of the second dataset. The process also includes selecting, based at least in part on the first and second log differences, between a linear chart scaling and a logarithmic chart scaling for the first dataset. The process also includes selecting, based at least in part on the first and second log differences, between a linear chart scaling and a logarithmic chart scaling for the second dataset.

9 Claims, 7 Drawing Sheets

DATASET CHART SCALING

BACKGROUND

Monitoring computer networks and other complex systems may involve obtaining and analyzing time-series data from a variety of sources. For instance, a data center may include thousands of computer systems and network devices that interconnect those computer systems.

BRIEF DESCRIPTION OF THE DRAWINGS

The following detailed description references the drawings, wherein.

DETAILED DESCRIPTION

Figure 1:
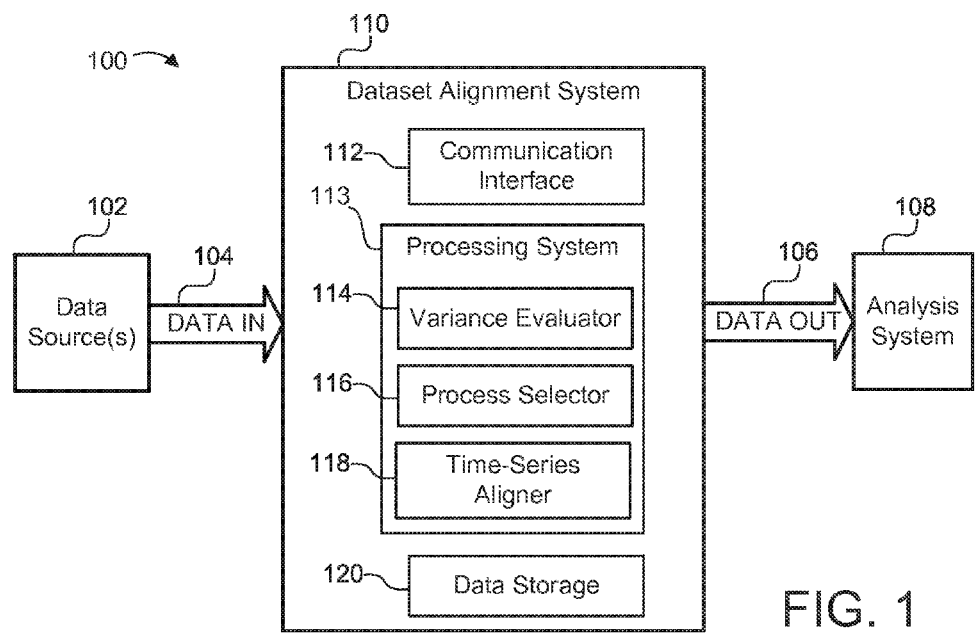
FIG. 1 is a block diagram of an example system for aligning time-series datasets.

The following description makes reference to the accompanying drawings, in which similar symbols identify similar components, unless context dictates otherwise. The descriptions herein, as well as the drawings, present examples of the subject matter of the present disclosure and are in no way limiting in regard to the subject matter disclosed herein. Throughout the description, the singular forms of "a", "an", and "the" mean "one or more". Thus, various examples in which a component is described in singular form also apply to examples having multiple of those components. Moreover, some aspects of the examples presented herein may be modified, re-arranged, re-ordered substituted, combined, and/or separated in a variety of different configurations without departing from the subject matter of the present disclosure.

As described herein, a time-series dataset is a set of values each associated with its own time stamp. Accordingly, a time-series dataset may be implemented as a two column array of numbers, with one column populated by a sequence of time stamps, and the other populated with a set of values measured and/or obtained at each of those time stamps. Two time-series datasets may be analyzed to determine the degree of correlation between the datasets. One example measure of correlation is the Pearson product-moment correlation coefficient, which is also referred to as the PPMCC, Pearson's r, or the PCC. The PCC is a normalized measure of the linear correlation between two sets of data. For any two datasets, the PCC is always between +1 and −1 inclusive. A PCC of +1 indicates total positive correlation, 0 indicates no correlation, and −1 indicates total negative correlation. While correlation does not always prove causation, a strong correlation between two datasets can be a useful tool when analyzing multiple data steams to identify relationships between different quantities.

As noted above, many systems are analyzed and monitored using time-series datasets collected from various sources. For example, in a networked computer system, system components may have sensors that measure physical parameters such as ambient temperature, on-chip temperature, fan speeds, etc. Such components may generate diagnostic reports or metrics related to performance such as logs of network throughput, memory utilization, cpu speed, etc. All of these data sources can then be reported to monitoring and/or analysis hubs as time-series datasets. Network administrators and others responsible for large computer networks and other complex systems may use real time streams of time-series datasets to identify issues affecting performance of the system and also diagnose the root cause of those issues to facilitate resolution as soon as possible. The degree of correlation between time-series datasets may provide information useful in such analysis. In addition, some analysis may be facilitated by viewing visualizations of the different data streams to observe the time-series datasets over some length of time, as opposed to having the relationship reduced to a single value such as the PCC.

Some aspects of the present disclosure provide a technique for visually representing two time-series datasets so as to intuitively emphasize the degree of correlation between the two. The time-series datasets may be plotted as points and/or lines with respect to a common time axis such that entries from the two datasets with similar time stamps are shown at correspondingly similar locations along the horizontal axis. In addition, the plots may be superimposed in a common chart area such that the two trend lines and/or data points for the two datasets overlay one another within the common chart area. In some examples, the common chart area may have a vertical axis that spans the collective domains of all datasets plotted therein and all of the datasets can be plotted with respect to the same vertical axis. In some examples, separate vertical axes may be used for plotting each of the datasets. In examples with multiple vertical axes, each vertical axis may be customized according to the values of its corresponding dataset, such as by scaling each based on the minimum and maximum values of its corresponding dataset. Moreover, the multiple customized vertical axes can overlap one another within the common chart area. For instance, all of the vertical axes may span the same vertical height of the common chart area. As a consequence, the respective minimum values of the multiple datasets may appear at a similar vertical position within the chart area. Similarly, the respective maximum values of the multiple datasets may appear at a similar vertical position within the chart area.

The present disclosure provides a technique in which a processing system may analyze two datasets to determine a vertical chart scaling for plotting the two datasets. The two datasets can be plotted versus time within a common chart area, perhaps using different colors and/or patterns to represent each dataset. The processing system may determine that the datasets should be plotted with respect to respective vertical axes having scales selected for each dataset. Further, depending on the domains and/or distributions of values in the two datasets, the processing system may determine that both vertical axes should be linearly scaled, or that one should be logarithmically scaled.

For instance, when plotting two time-series datasets, both datasets may be plotted with respect to a common horizontal axis. The horizontal axis may represent time and can span at least a portion of the overlapping time range spanned by the time stamps of both datasets. In some examples, the vertical axis for each dataset can be superimposed on one another, and each can have a separate scaling and/or domain. For example, the vertical axis for the first time-series dataset may be linearly scaled between the minimum and maximum values of the first time-series dataset. Similarly, the vertical axis for the second time-series dataset may be linearly scaled between the minimum and maximum values of the second time-series dataset. In some examples, one of the vertical axes may be logarithmically scaled and the other can be linearly scaled.

A vertical axis domain and scale for the first dataset may be determined based on the values in the first dataset. Separately, for the second dataset, a vertical axis domain and scale can be determined on the values in the second dataset. The two time-series datasets can then be plotted versus time in a common chart area. That is, the values of the first dataset can be plotted with respect to a vertical axis that spans the vertical dimension of the chart area and which has the domain and scale determined for the first dataset. Similarly, the values of the second dataset can be plotted with respect to a second vertical axis that also spans the vertical dimension of the chart area, but which has the domain and scale determined for the second dataset. As a consequence, the plots of the two datasets may overlay one another within the chart area even if the domains of the two datasets do not overlap. For instance, the values in the first dataset may offset from those of the second by an additive factor, or the values of the first dataset may be related to those of the first by a multiplicative factor. Moreover, if one dataset is plotted with a logarithmic scaling, a degree of correspondence may be evident even if a power law relationship exists between the values of the first dataset and those of the second dataset, or if the relationship involves another non-linear relationship.

In some examples, techniques described herein may be used to determine a chart scaling for a chart in a display area of a user interface. The user interface may include display regions for providing information to a user and for receiving input from the user. Such display regions may include, for instance, indications of the source(s) of the datasets plotted in the visualization, indications of the automatically selected domain and/or scaling used for each dataset. Input regions of the display may include selectable regions that allow the user to indicate particular datasets to include in the chart and/or to indicate particular domain and/or scaling settings to use when plotting the datasets.

In some examples, a visualization system with the features described herein may be employed during root cause analysis to assist an engineer in evaluating multiple datasets and identifying patterns and trends between different datasets. In some examples, a data center may include thousands of computing systems, each of which may generate multiple streams of data for diagnostic and/or problem-solving analysis. Data streams may be sent to a computer to monitor the data center and/or analyze conditions of the data center. An administrator may monitor system performance via a user interface of the analysis computer. Such an administrator may observe visual representations of various data to evaluate performance of the data center and/or to help identify the source(s) of faults and/or degradations, should they occur.

In the event of a fault or a degradation in performance, the network administrator may use the analysis computer to identify relationships between different datasets that may help reveal the root cause of the fault or degradation. Once the root cause is identified, remedial action(s) can be taken to mitigate the fault or degradation. To assist in identifying relationships between datasets, the analysis computer may temporally align the incoming datasets and compute PCC values for pairs of datasets. The user interface may include a listing of paired datasets and the respective PCC values for each pair. In addition, the user interface may display a chart that includes a plot of value versus time for at least some of the incoming datasets to assist the administrator in intuitively recognizing patterns and/or relationships between the different streams of data.

In some examples, significant commercial and/or official processes may depend on the uninterrupted operation of data centers, such as websites for retail entities, government information, banking systems, and the like. Degradation and/or temporary failure of such systems may lead to corresponding disruptions in such processes, such as interrupted transaction(s), inability to purchase/sell merchandise, etc. Minimizing the time required to investigate and mitigate any performance failure(s) and/or degradation(s) may therefore lead to significant financial savings for the operators of such data centers and other systems. The charting technique described herein may help facilitate rapid and intuitive investigation and resolution of performance failure(s) and/or degradation(s), and thereby help to realize significant financial savings.

FIG. 1 is a block diagram of an example system 100 for aligning time-series datasets. The system 100 includes a data alignment system 110, a data source 102, which sends input data 104 to the dataset alignment system 110, and an analysis system 108, which receives output data 106 from the dataset alignment system 110. The dataset alignment system 110 includes a communication interface 112, a processing system 113, and data storage 120. The processing system 113 may be communicatively coupled to the communication interface 112 and the data storage 120 via a bus and/or network. The processing system 113 can include functional modules that perform predetermined tasks and/or routines. These functional modules include a variance evaluator 114, a process selector 116, and a time-series aligner 118. In some examples, the dataset alignment system 110 may be a computing system having processor(s), memory, and instructions such as software and/or firmware features stored in the memory that define processes performed by the computing system upon execution of such features by the processor(s). In some examples, the dataset alignment system 110 may include hardware features to perform processes described herein, such as logical circuit(s), application specific integrated circuit(s), etc.

The communication interface 112 may receive the input data 104 from the data source 102 via a communication network. For instance, the data source 102 may include sensors and/or status reporting modules on multiple computers in a network of computing systems that are linked via a network. The communication interface 112 may include a network interface card (NIC) or another component to receive signals from a communication path, demodulate and/or decode the data from the signals, and/or apply error correction to retrieve data packet(s), header information, etc. in accordance with various communication protocols. The communication interface 112 may also send data to another terminal by generating data packets, header information, and so forth; encoding and/or modulating a signal based on the data to be communicated; and transmitting the signal. Moreover, the communication interface 112 may perform decryption and encryption to facilitate secure communications according to various standards and protocols.

The variance evaluator 114 may determine a degree of variance of each received dataset. The variance evaluator 114 may perform an analysis on a dataset that generates a quantified representation of the degree of variance of that dataset. In some examples, the variance evaluator 114 may compute an autocorrelation of a dataset. For example, for a dataset X with n values X[i], i=1 . . . n, the autocorrelation of X can be computed between two versions of X, one delayed with respect to the other. For instance, for A={$X_1$, . . . , $X_{n-1}$}; B={$X_2$, . . . , $X_n$}:

$$r_{AB} = \frac{\text{cov}(A, B)}{\sigma_A \sigma_B} = \frac{\sum_{i=1}^{n-1}(A_i - \overline{A})(B_i - \overline{B})}{\sqrt{\sum_{i=1}^{n-1}(A_i - \overline{A})^2} \sqrt{\sum_{i=1}^{n-1}(B_i - \overline{B})^2}}$$

with $\overline{A}$ and $\overline{B}$ being the mean of A and B, respectively; and with $\sigma_A$ and $\sigma_B$ being the standard deviation of A and B, respectively. The autocorrelation $r_{AB}$ is a quantified representation of the degree of variance of the dataset X. Other measures of variance (or volatility) may be used in some examples.

The process selector 116 may select a time alignment process based on the degrees of variance determined by the variance evaluator 114. In some examples, the process selector 116 may compare the autocorrelations with a threshold to distinguish between datasets that are smooth and those that are not smooth. The process selector 116 may then select a time alignment process that is suitable for processing the two datasets based on the degree of variance of each. In practice, such selection may be based on whether each of the two datasets is in one of two states: smooth or not smooth, as determined by the threshold comparison. For example, for two arbitrary datasets, the degrees of variance determined by the variance evaluator 114 may indicate either: (1) both are smooth, (2) both are noisy, or (3) one is smooth and the other is noisy. The process selector 116 may select among 3 possible time alignment processes depending on which of the three smoothness states the two datasets are in. For instance, the process selector 116 may allow smooth datasets to be processed using interpolation techniques, but not allow such processing for datasets which are not smooth.

For examples in which the degree of variance is an autocorrelation, a threshold of approximately 0.8 may be used to distinguish between datasets which are smooth and those that are not. The precise value used for the threshold may depend on the nature of the datasets, the trends represented, and/or the source(s) from which the datasets originate. In practice, a skilled administrator may tune the smoothness threshold based on such factors and/or based on observed performance to achieve an automated time alignment process that sensibly distinguishes between smooth datasets and noisy datasets.

The time-series aligner 118 may generate an aligned time-series dataset by processing the received input data 104 according to the process selected by the process selector 116.

Data storage 120 can include a non-transitory machine-readable medium, and may include random access memory (RAM) and/or read-only memory (ROM) that stores data and executable instructions for causing the system 110 to operate as described herein. Data storage 120 may include indications of the multiple time alignment processes available for selection by the process selector 116. Data storage 120 may also store executable instructions for causing the variance evaluator 114 to compute a quantified value representing the degree of variance of a given dataset, instructions for causing the process selector 116 to select among multiple alignment processes based on the degrees of variance, and instructions for causing the time-series aligner 118 to process received datasets in accordance with the selected time alignment process to thereby generate an aligned time-series dataset. Further, volatile memory may be used to store received datasets and/or aligned time-series datasets during the performance of various computations by processing components of the time alignment system 110. Moreover, some or all of the machine-readable instructions used in implementing processes of the dataset alignment system 110 may be stored at a remote server that may receive calls for completing processes and returning results. In some examples, a remote server may be used to store indications of the multiple alignment processes from which the process selector 116 selects a time alignment process.

Figure 2:
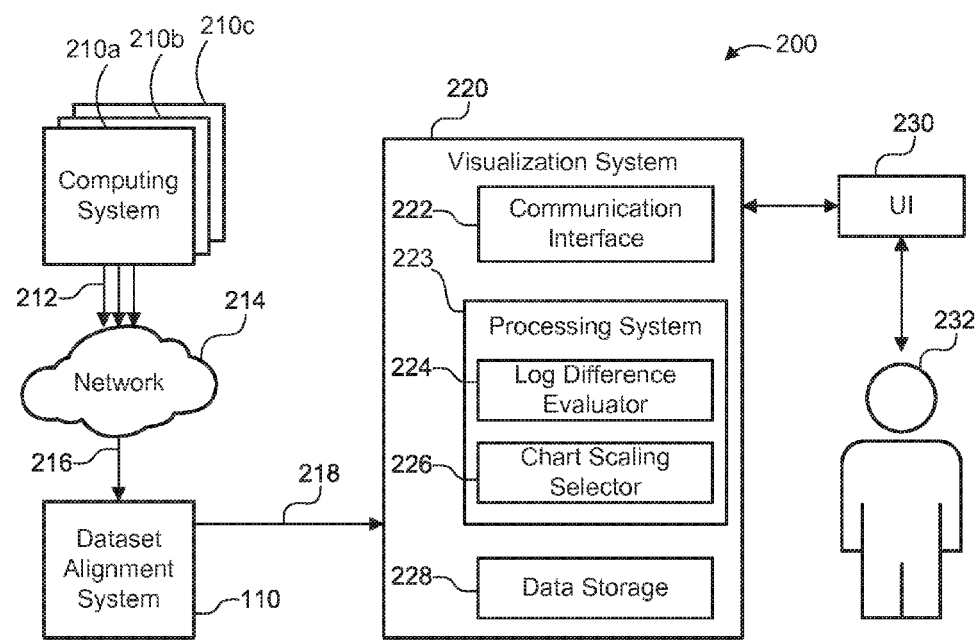
FIG. 2 is a block diagram of an example system in which a user can analyze time-series data.

FIG. 2 is a block diagram of an example system 200 in which a user can analyze time-series data from a computer network. The system 200 includes the data alignment system 110, which receives input data 216 indicative of metrics, sensor measurements, and/or other information related to system performance for a group of networked computing systems 210a-c. In some examples, the computing systems 210a-c may be a group of networked computers (e.g., servers) in a data center. Each of the computing systems 210a-c may include sensors that measure parameters of the computing systems related to system performance. In some examples, the computing systems 210a-c may generate logs and/or metrics related to system performance (e.g., memory utilization, CPU speed or utilization, network bandwidth, etc.). The computing systems 210a-c may transmit such data 212 via communication network 214 to the dataset alignment system 110. The dataset alignment system 110 can then analyze the received datasets and generate an aligned time-series dataset as described above. The dataset alignment system 110 can send the generated aligned time-series datasets 218 to a visualization system 220.

The visualization system 220 may be a computer system with a communication interface 222, a processing system 223, and data storage 228. The processing system 223 may be communicatively coupled to the communication interface 222 and the data storage 228 via a bus and/or network. The processing system 223 can include functional modules that perform predetermined tasks and/or routines. These functional modules include a log difference evaluator 224 and a chart scaling selector 226. The visualization system 220 may be associated with a user interface 230. The user interface 230 may include, for example, a display device that renders display information in accordance with corresponding instructions from the visualization system. A user 232 can then observe such displayed information on the user interface 230 and thereby monitor the performance of the computing systems 210a-c (as indicated by their respective performance metrics and/or measurements. In some examples, the visualization system 220 may be a computing system having processor(s), memory, and instructions such as software and/or firmware features stored in the memory that define processes performed by the computing system upon execution of such features by the processor(s). In some examples, the dataset alignment system 220 may include hardware features to perform processes described herein, such as logical circuit(s), application specific integrated circuit(s), etc.

The communication interface 222 may receive the datasets 218 from the dataset alignment system 220. For instance, the communication interface 222 may be similar to the communication interface 112 described above in connection with system 110. The visualization system 220 may compute values indicative of degrees of similarity between multiple aligned time-series datasets. In some examples, the visualization system 220 may generate a PCC for at least two aligned time-series datasets. The system 220 may generate PCCs for each independent pair of multiple aligned time-series datasets. The PCCs for each independent pair can be used to infer relationships between various datasets. For example, the degree of correlation between datasets for measurements and/or metrics related to system performance may be used to infer relationships between those datasets.

The visualization system 220 also includes the log difference evaluator 224 and the chart scaling selector 226, which can be used to help generate a chart of multiple datasets in a common chart area. In some examples, the chart scaling selector 226 can be used to automatically select between a linear chart scaling and a logarithmic chart scaling for two different datasets based on information about the domain and/or distribution of those datasets determined by the log difference evaluator 224. In addition, the visualization system 220 and/or user interface 230 may include a module to determine which ones of multiple incoming datasets to include in a chart displayed via the user interface and a module to generate display instructions for rendering a particular chart of selected datasets in accordance with a selected chart scaling. In some examples, the visualization system 220 may compute PCC values for pairs of incoming datasets and determine that the two datasets with the greatest PCC should be included in a chart displayed via the user interface 230.

For each dataset to be charted, the log difference evaluator 224 may determine an order-of-magnitude spanned by the domain of that dataset. For example, the log difference evaluator may compute the logarithm of the minimum value in each dataset and also compute the logarithm of the maximum value in each dataset. The log difference evaluator may then compute the difference between the two logarithms. The log difference evaluator 224 may employ calculations that take advantage of properties of the logarithm, such as by computing the logarithm of the ratio between the maximum value and the minimum value. For base 10 logarithms, this computation reveals the number of order-of-magnitudes spanned by the domain of the values in the dataset.

Based on information from the log difference evaluator, the chart scaling selector 226 may determine a scaling for the datasets to be used when charting both in a common area. The chart scaling selector 226 may determine that two such datasets should be plotted using a single common vertical axis (e.g., an axis that spans the domain between the minimum and maximum values of the two datasets). In another example, the chart scaling selector 226 may determine that two datasets should be graphed within a single chart area, but using independent linearly scaled vertical axes for each dataset, such that the two datasets may be displayed as overlaying one another even if their respective values are in separate, non-overlapping domains. In another example, the chart scaling selector 226 may scale the values in each aligned time-series dataset relative to the maximum value of each. For metrics that are always positive, such as bandwidth, utilization, speed, etc., this results in a set of values between 0 and 1 (i.e., between zero and the maximum value), which may then be plotted on a common vertical axis regardless of the absolute values of the datasets. In still other examples, the chart scaling selector 226 may determine that one dataset should be plotted using a logarithmic scale while another should be plotted using a linear scale.

The determination of which scaling to use for graphing particular datasets may be based on multiple factors so as to render a visual representation of the datasets that facilitates understanding and analysis by the user 232. Among other factors, the charting decision engine 226 may base such decisions on the domains of the datasets graphed (i.e., the minimum and maximum values), the degree of similarity between the datasets, and/or the distribution of values within each dataset.

The user interface 230 may include components for providing information to the user 232, such as a display, an audio speaker, a haptic feedback system, and/or another system that outputs perceptible signals to the user 232. The user interface 230 may also include components for receiving inputs from the user 232, such as a microphone, a camera, a keyboard, a touch-sensitive panel, buttons, levers, etc. For instance, the user interface 230 may include a touch-sensitive display that displays information related to: (1) the origin of the received aligned time-series datasets 218, (2) the degree of dependence among at least some pairs of those datasets (e.g., as indicated by PCC value), and (3) a chart with at least some of the datasets graphed over time (e.g., according to the scaling determined by the chart scaling selector 226). In addition, such a touch-sensitive display may include regions indicated by suitable fields on the display for the user 232 to manipulate the information rendered thereon. For example, the user interface 230 may allow the user 232 to modify lists of available datasets (e.g., to filter and/or sort available datasets by time, origin, name, etc.), to manually select which datasets to chart and/or which datasets to evaluate for comparison, and/or to manually select a type of chart and/or scaling with which the datasets are presented (e.g., to over-ride the automatic determination of the charting scaling selector 226). Of course, many other examples of input devices are possible.

Data storage 228 may include volatile and/or non-volatile memory and can store executable machine-readable instructions that, when executed by the processing system 223, cause the modules noted above (e.g., 224, 226, etc.) to perform the processes described herein. That is, some of the processes described herein in relation to the log difference evaluator 224, the chart scaling selector 226, and/or those related to selecting datasets and generating display instructions may involve software-implemented routines that are stored as machine-readable instructions on data storage 228. Moreover, some or all of the machine-readable instructions used in implementing functions of the visualization system 220 may be stored at a remote server that receives calls for providing certain functionality and returning results.

Figure 3A:
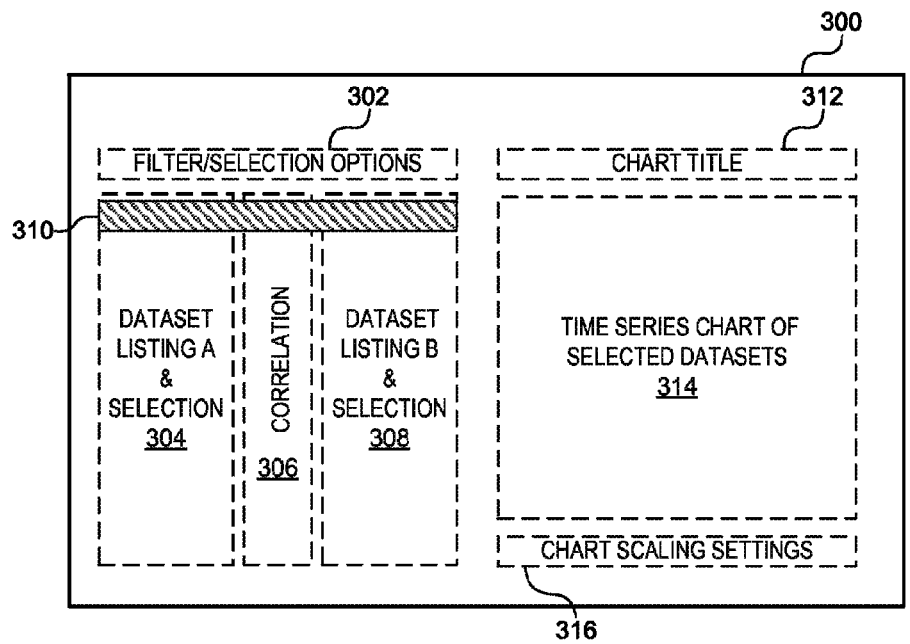
FIG. 3A is a diagram of an example user interface display layout for a dataset analysis and visualization system.

FIG. 3A is a diagram of an example user interface display layout 300 for a dataset analysis and visualization system. In some examples, the display of the user interface 230 associated with the visualization system 220 of FIG. 2 may include a display device that renders a display according to the layout 300. The layout 300 includes fields in which visual information is displayed for a user, such as a system administrator. In addition, the layout 300 includes fields for receiving input(s) from the user. For instance, some fields may include features for the user to indicate selections, such as via a touch screen, a pointing device, or another user input device.

As shown in FIG. 3A, the layout 300 includes a selection field 302, dataset listing fields 304, 308, correlation field 306, selection indicator 310, chart title field 312, chart field 314, and chart options field 316. The selection field 302 may be for receiving user inputs related to selecting and/or filtering a listing of available datasets. Dataset listing fields 304, 308 may be for displaying a listing of at least some of the available datasets. In some examples, the two dataset listing fields 304, 308 can provide a listing of pairs of datasets ordered in accordance with the degree of correlations of the pairs and/or in accordance with settings selected by a user. For example, dataset listing field A 304 can include a listing of datasets with one in each row. Similarly, dataset listing field B 308 can include a listing of datasets with one in each row such that corresponding rows of the two dataset listing fields 304, 308 are a pair of datasets that can be selected (e.g., via the selection indicator 310). The correlation field 306 can display an indication of the degree of correlation between each pair of dataset—for each row of the dataset listing fields 304, 308. For example, the correlation field 306 may include a listing of PCC values with one in each row and each PCC value can indicate the degree of correlation between the datasets listed in the corresponding row of the dataset listing fields 304, 308. In addition, the listing of dataset pairs in the fields 304, 308 may be ordered according to the degree of correlation shown in field 306. For example, components of the visualization system 220 may receive a group of datasets, compute degrees of correlation (e.g., PCC values) for each non-redundant pair of those datasets and then order the pairs of datasets according to the degrees of correlation. The resulting listing of ordered datasets and degrees of correlation may then be displayed in the fields 304, 306, 308.

The selection indicator 310 may be a visual feature that differentiates a single row of the listed datasets and correlation values in the fields 304, 306, 308. In some examples, the selection indicator 310 may include a highlighted box, a shaded region, a variation in typeface of font, or another indicator. The single pair of the datasets indicated by the selection indicator 310 may be shown as a time series chart in the chart field 314. In some examples, the selection indicator 310 may default to selection to the pair of datasets with the greatest degree of correlation. In some examples, the selection indicator 310 may be manipulated by the user to select a pair of datasets to include in the chart from among those listed in the fields 304, 308.

The chart title field 312 may include an indication of the datasets plotted in the chart field 314. The chart field 314 may include a plot in which two time-series datasets are plotted as lines and/or points with respect to a common horizontal time axis. The two time-series datasets may be the two datasets indicated by the selection indicator 310. As described further with respect to FIGS. 4A and 4B, the two time-series datasets can be plotted with respect to separately scaled, overlaid vertical axes. Thus, a first one of the time-series datasets can be plotted with respect to a first vertical axis that is either linearly scaled or logarithmically scaled between first minimum and maximum values sufficient to span the domain of the values in the first time-series dataset. A second one of the time-series datasets can be plotted with respect to a second vertical axis that is either linearly scaled or logarithmically scaled between second minimum and maximum values sufficient to span the domain of the values in the second time-series dataset. Moreover, the two separately scaled vertical axes may at least partially overlay one another in a common vertical extent of the chart field 314. In some examples, the two vertical axes may occupy an identical vertical extent of the chart field 314. As such, the plots of the two time-series datasets may overlay one another in a common vertical portion of the chart field 314 even if the two datasets have non-overlapping domains.

The chart options field 316 may display an indication of the chart scalings used for each of the time-series datasets included in the chart (e.g., the chart scalings automatically selected by the visualization system 220). In addition, the chart option field 316 may include input regions for a user to select desired chart scaling options. For example, the chart option field 316 may include input regions for a user to select to modify the chart scalings (e.g., to over-ride the automatically selected scalings). Example processes for selecting chart scalings to use when plotting a pair of time-series are described herein in connection with FIGS. 4A-4B.

In some examples, the line(s) and/or point(s) for the two datasets may be displayed using different shapes, colors, shading, and/or patterns for the two datasets such that the plots of the two time-series datasets can be visually distinguished. The chart field 314 may include a legend, for example, to map each line pattern, color, and/or symbol to a particular time-series dataset.

Figure 3B:
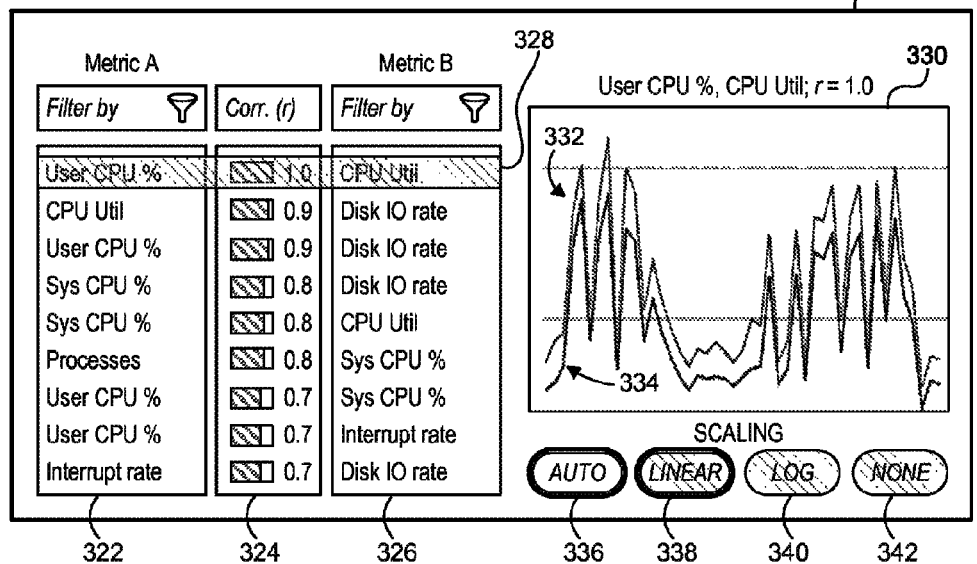
FIG. 3B shows an example display arranged according to the layout in FIG. 3A.

FIG. 3B shows an example display 320 arranged according to the layout in FIG. 3A. As shown in FIG. 3B, the display 320 shows a list of time-series datasets in fields 322, 326. The datasets listed in corresponding rows of the two fields 322, 326 are paired and the pairs are ordered according to the degrees of correlation of the pairs, which is shown in the correlation field 324. The correlation field 324 includes a PCC value for each pair and a graphical representation, which is shown as a bar that is partially shaded to represent values between 0 and 1. The top row of the two dataset fields 322, 326 and the top row of the correlation field 324 are shaded by the selection indicator 328, which visually indicates that the chart displays a plot of the pair datasets within the selection indicator.

The display 320 also includes a chart field 330 which includes a pair of plotted lines 332, 334. The lines 332, 334 may each be plots of values in one of the time-series datasets indicated by the selection indicator 328. As shown in FIG. 3B in the selected row of fields 322, 324, 326, the two time-series datasets selected are named "User CPU %" and "CPU Util", and the two have a PCC value (i.e., r) of about 1.0. The two time-series datasets are plotted with respect to a common horizontal time axis, which may span an overlapping portion of the time ranges spanned by the two time-series datasets. Thus, the lighter line 332 may be a plot of "User CPU %" versus time and the darker line 334 may be a plot of "CPU Util" versus time.

The scaling option fields 336, 338, 340, 342 situated below the chart field 330 indicate the chart scaling used to plot the two datasets and also allow a user to modify the chart scalings. As shown in FIG. 3B, an auto indicator 336 is selected, which is indicated by the bolded outline around the auto indicator 336. The selected auto indicator 336 provides a visual cue to the user that the visualization system is in auto scaling mode, in which the system automatically selects a chart scaling for the two datasets plotted in the chart field 330. In addition, while the auto indicator 336 is selected, the linear indicator 338, logarithmic indicator 340, and no scaling indicator 342 are shaded to indicate that scaling options are being automatically determined by the visualization system, rather than a manual input. The linear indicator 338 is shown in a selected state (e.g., with a bold outline), which indicates that the automatic chart scaling has selected the linear chart scaling for plotting the two datasets—the lines 332, 334. The scaling option fields 336, 338, 340, 342 illustrate one example of a user interface which both indicates a currently applied chart scaling and facilitates user inputs to modify the chart scaling. Many other examples are possible for such a user interface.

The display 320 may be used to receive user inputs, such as via a user input device for selecting particular regions of the display. In some examples, the selection indicator 328 may be moved via user input to change the datasets plotted in the chart region. In some examples, the datasets listed in the fields 322, 326 may be filtered according to various factors via user interaction with the fields depicted immediately above the two dataset fields 322, 326. For example, the filter boxes may include drop-down options for a user to select various features to use in filtering and/or selecting a subset of available datasets to include in the fields 322, 326. Moreover, in addition to the degrees of correlation, the datasets may be ordered and/or compared according to various factors, which may be selected via user interaction with the field immediately above the correlation field 324. Further, a user may provide inputs to any of the scaling option fields 336, 338, 340, 342 to modify the chart scalings applied to one or both of the plotted datasets. For instance, the auto indicator 336 may be selected via the user interface to toggle whether the visualization system automatically determines chart scalings for each dataset. Additionally, either of the chart scaling indicators 338, 340, 342 may be selected via the user interface to change the chart scaling that is currently being used.

Figure 4A:
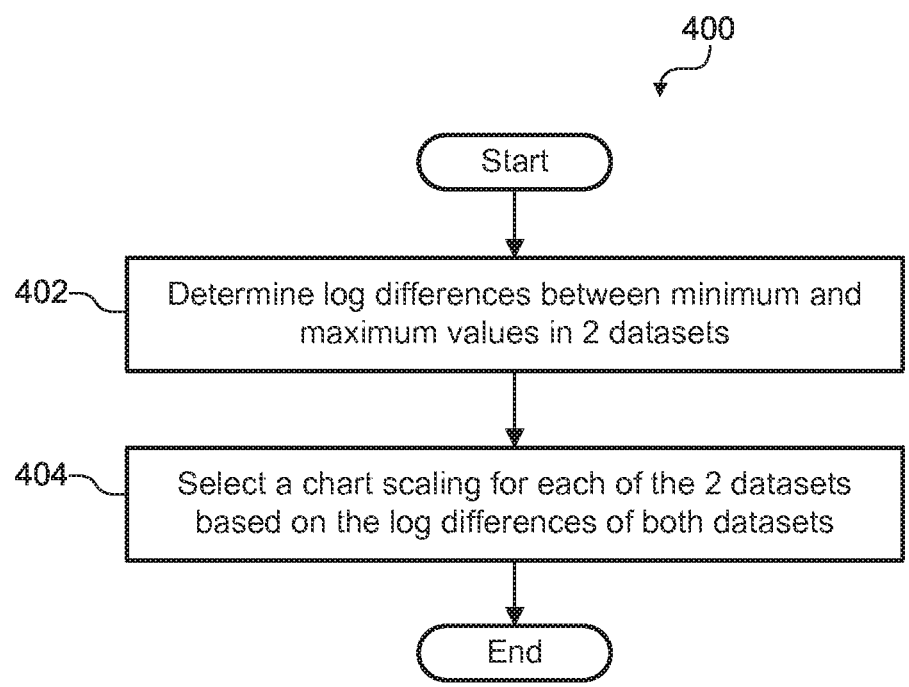
FIG. 4A is a flowchart of an example dataset chart scaling process.

FIG. 4A is a flowchart of an example dataset chart scaling process 400. The process 400 may be performed by the visualization system 220 described above in connection with FIGS. 2 and 3. By way of example, the flowchart of process 400 is described with reference to system 220.

At block 402, the system may determine log differences between minimum and maximum values of two different datasets. The log differences can provide a measure of the domain spanned by each of the datasets. For example, for base 10 logarithms, the difference between the log of the maximum value and the log of the minimum value (the log difference) of the dataset is the number of order-of-magnitudes spanned by the dataset. For instance, an example dataset may have a minimum value of 0.01 and a maximum value of 100—that is, a domain of (0.01, 100). The log difference of such a dataset is:

$$\log \text{Diff}=\log(\max)-\log(\min)=\log(100)-\log(0.01)=2-(-2)=4.$$

At block 404, a chart scaling for each of the two datasets is selected based at least partially on the log differences. In some examples, the log difference of each dataset is compared with a threshold, and the chart scaling selector 226 may then select between a linear chart scaling and a logarithmic chart scaling for each based at least in part on the log differences. In some examples, the selection between linear and logarithmic chart scalings may also involve evaluating the distribution of values in each dataset. For example, the chart scaling selector 226 may determine a proportion of values falling within each of a set of bins that divide the domains of the datasets. This may involve, for example, determining a fraction of the values that are within some threshold of the minimum value (or the maximum value), and the threshold value may be based on the domain of the dataset (e.g., 20% of the difference between the maximum and the minimum values).

A variety of different indicators of the distribution of values may be used, and such indicators may be selected and/or optimized by administrators based on desired system performance, among other factors. In some cases, such indicators may include a ratio of values above/below the mean and/or median, fractions of values in different population bins (e.g., dividing the domain into N evenly spaced bins and computing the percentage of the population in each bin, or at least some bins), value cutoffs between population percentiles (e.g., dividing the population into M evenly sized groups of values and identifying the values that separate each group from the others), and other indicators of the distribution of the values in the population. Such indicators (or combinations of indicators) may be used by the chart scaling selector to determine whether values in a given dataset are grouped near the maximum and/or minimum, which may indicate that a logarithmic chart scaling will allow for a better visualization of trend(s) indicated by those values.

Moreover, in some examples, an analysis of the distribution of values in a dataset may involve computing a value that characterizes the distribution, such as skewness and/or kurtosis. As one example, the kurtosis provides an indication of the relative degree of sharpness of a distribution of a population with respect to a center point, such as a mean value. Populations with greater kurtosis values have a distribution of values that is more sharply peaked about a central value, whereas populations with lesser kurtosis values have a distribution that is more evenly distributed throughout the domain of the values.

Thus, in some examples, an analysis of the distribution of values in a dataset may involve computing a kurtosis of the values and comparing the kurtosis with a threshold. For example, if the kurtosis is below the threshold, the chart scaling selector 226 may determine that a linear chart scaling should be used for that dataset, because the resulting plot will be distributed across the vertical dimension of the chart area and thereby help facilitate intuitive visual analysis. On the other hand, if the kurtosis is above the threshold, the chart scaling selector 226 may determine that a logarithmic chart scaling, because converting to a logarithmic scale may help distribute the plotted values across the vertical dimension of the chart and thereby help facilitate visual analysis of the trends represented by the plot.

In some examples, the chart scaling selector 226 may further compute indicators that characterize statistical features of the distribution of values in a dataset first using the linearly scaled values (i.e., the raw numbers), and also compute such indicators for a second distribution of logarithms of those values. The chart scaling selector 226 may then select a chart scaling that corresponds to the distribution in which the values are more evenly distributed (e.g., lower kurtosis). As a consequence, the chart scaling selector 226 may select the scaling in which the resulting plot more evenly occupies the vertical extent of the chart area.

Figure 4B:
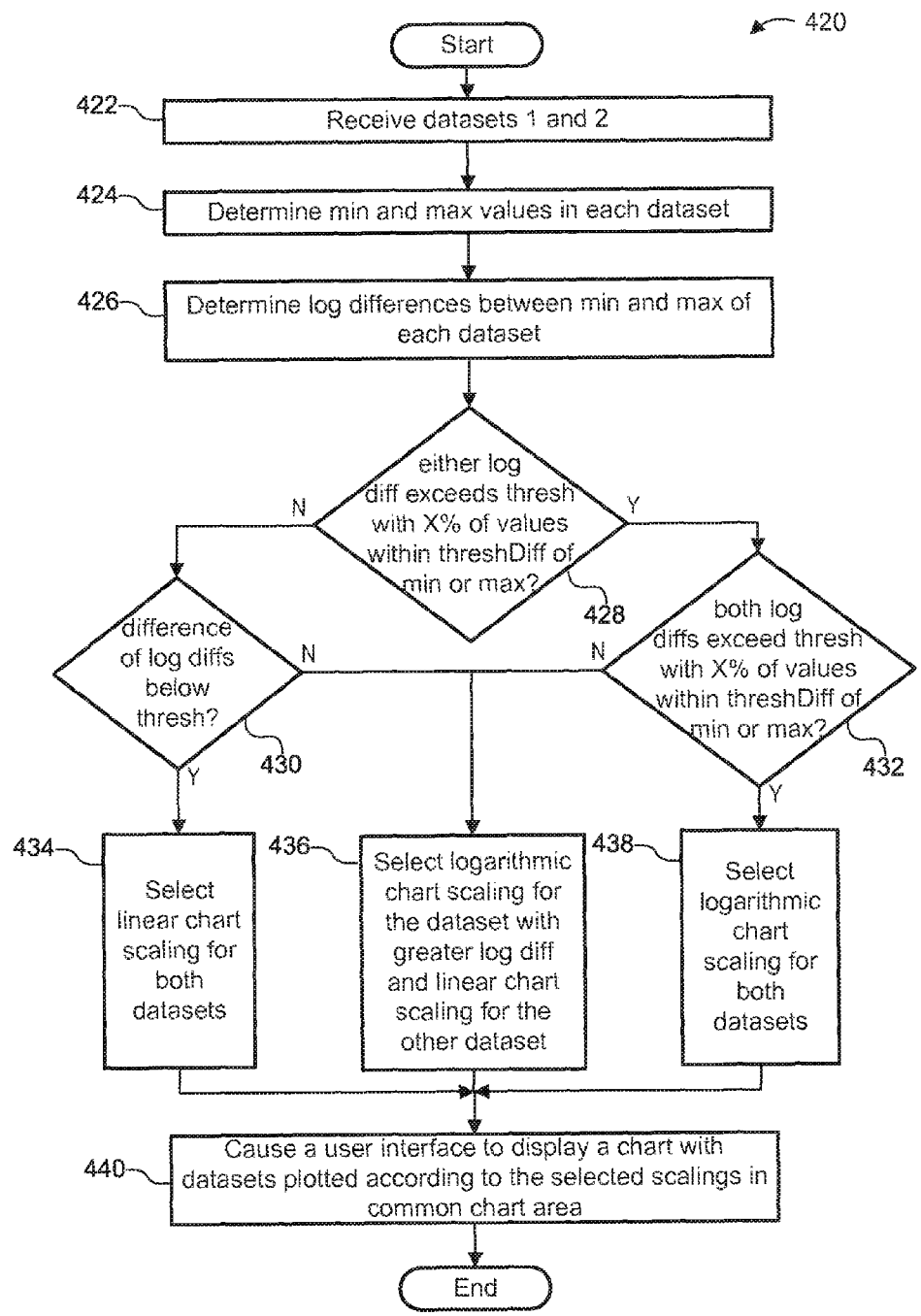
FIG. 4B is a flowchart of an example dataset chart scaling process.

FIG. 4B is a flowchart of an example dataset chart scaling process 420. The process 420 may be performed by the visualization system 220 described above in connection with FIGS. 2 and 3. By way of example, the flowchart of process 420 is described with reference to system 220.

At block 422, two time-series datasets may be received. For example, the visualization system 220 may receive two time-series datasets from the dataset alignment system 110 via the communication interface 222.

At block 424, the minimum and maximum values of each dataset may be determined. For example, the log difference evaluator 224 may analyze the first time-series dataset and identify the minimum and maximum values. The log difference evaluator 224 may also analyze the second time-series dataset and identify the minimum and maximum values.

At block 426, the log difference between the minimum and maximum values of each dataset may be determined. For example, the log difference evaluator 224 may compute the logarithms of the minimum and maximum values of the first time-series dataset and then compute the difference between those values. Similarly, the log difference evaluator 224 may also compute the logarithms of the minimum and maximum values of the second time-series dataset and then compute the difference between those values.

At block 428, the two log differences determined in block 426 may be compared with a threshold. In addition, the distribution of the datasets may be analyzed. For example, the chart scaling selector 226 may determine whether a threshold percentage of values are within a threshold-difference of the minimum or maximum. The chart scaling selector 226 may select a threshold difference from the minimum and/or maximum (e.g., based on the domain of the dataset) and determine the proportion of values in the dataset that are within such threshold-difference of the minimum and/or maximum. As one example, the chart scaling selector 226 may determine the proportion of values within 10% of the total domain (i.e., difference between maximum and minimum) of both the minimum value and the maximum value. As noted above, additional techniques may be used for analyzing the distribution of values in a dataset, such as computing skewness, kurtosis, etc. In some examples, the chart scaling selector 226 may perform the distribution analysis for a given dataset in response to the log difference of that dataset exceeding a threshold. For instance, the chart scaling selector 226 may first determine whether either log difference exceeds 2 (e.g., 2 order-of-magnitudes for base 10 logarithms). For the datasets with a log difference above the threshold, the chart scaling selector 226 may then analyze the distribution of those datasets.

As shown in FIG. 4B, if either of the log differences exceeds the threshold and a threshold percentage of values are also within a threshold-difference of the minimum or maximum (or the distribution is otherwise satisfactory), the process 420 may proceed to block 432. If not, the process may proceed to block 430. At block 430, the log differences for both datasets may be compared to determine whether they differ by less than a threshold value. Because the log differences themselves indicate a number of order-of-magnitudes spanned by the domains of each dataset, comparing the log differences from both datasets indicates the difference in order-of-magnitudes spanned by the two domains. For example, block 430 may involve determining whether the order-of-magnitudes spanned by the two domains differ by more than one.

If, at block 430, the difference of the two log differences is less than the threshold, then the span of the two domains may be considered sufficiently similar to plot both with a linear chart scaling. As a consequence, the process 420 may proceed, at block 434, by selecting a linear chart scaling for both datasets. As illustrated by FIG. 4B, selecting linear chart scaling for both datasets at block 434 may be performed after determining that: (i) neither dataset has a log difference exceeds the threshold and a threshold percentage of values within a threshold-difference of either the minimum or maximum, at block 428, and (ii) the difference between the log differences of the two datasets is below a threshold, at block 430.

On the other hand, if, at block 430, the difference of the two log differences is greater than the threshold, then the span of the two domains may be considered insufficiently similar to plot both with a linear chart scaling. Thus, the process 420 may proceed, at block 436, by selecting a logarithmic chart scaling for the dataset with the greater log difference and a linear chart scaling for the other dataset. Thus, the dataset with a domain that spans a greater number of order-of-magnitudes is plotted with a logarithmic chart scaling while the dataset with a domain that spans a lesser number of order-of-magnitudes is plotted with a linear chart scaling. By displaying the two plots in a single common chart area with the respective vertical axes overlaid on one another, the user interface may allow features of the two datasets to be intuitively compared. For instance, features/ trends of the larger order-of-magnitude-domain dataset may be relatively difficult to discern in a linearly scaled chart, because the visually discernible features be dominated by extrema points. However, those same features may be more readily discernible in a logarithmically scaled chart. Thus, when the order-of-magnitudes spanned by domains in two datasets differ by more than a threshold value, as indicated by block 430 being NO, the chart scaling selector 226 may select a logarithmic chart scaling for the dataset with a greater log difference and select a linear chart scaling for the dataset with the lesser log difference.

At block 432, the datasets may be analyzed to determine whether both datasets have a log difference that exceeds the threshold and a distribution that satisfies some criteria. As noted above, analyzing the distributions may involve generating indicator(s) of the distribution of values in each dataset. As one example, the chart scaling selector 226 may determine the proportion of values within 10% of the total domain (i.e., difference between maximum and minimum) of both the minimum value and the maximum value. Additional techniques may be used for analyzing the distribution of values in a dataset, such as computing skewness, kurtosis, etc. Thus, whereas block 428 may involve determining whether either of the two datasets satisfy the criteria of a log difference greater than a threshold and a distribution that satisfies some criteria, block 432 may involve determining whether both datasets satisfy those criteria. If so, the process 420 may proceed, at block 438, by selecting a logarithmic chart scaling for both datasets. If not, the process 420 may proceed to block 436 and select a logarithmic chart scaling for the dataset with a greater log difference and a linear chart scaling for the dataset with a lesser log difference.

At block 440, a user interface may be caused to display a chart with both datasets plotted in a common chart area according to their respectively selected chart scalings. For example, the visualization system 220 may provide display instructions to the user interface 230 which causes a display device thereof to render a chart in which the values of the first dataset are plotted versus time using a selected one of a linear or logarithmic chart scaling. The values of the second dataset can also be plotted versus time using its selected chart scaling. In some examples, the horizontal axis is a common time axis that spans at least a portion of an overlapping time interval between the two time-series datasets. In some examples, the vertical axis of both plots may be overlaid on one another and may have separately determined minimum and maximum values. For instance, each dataset may have a vertical axis that spans the domain of that dataset. Moreover, the vertical axes may not be rendered on the display itself, but used to arrange the positions of the respective plotted symbols and/or lines. Thus, the chart displayed via the user interface may not include a vertical axis. This may help the user intuitively focus on the relationships between trends revealed by the overlaid plots, rather than the values themselves.

Figure 5A:
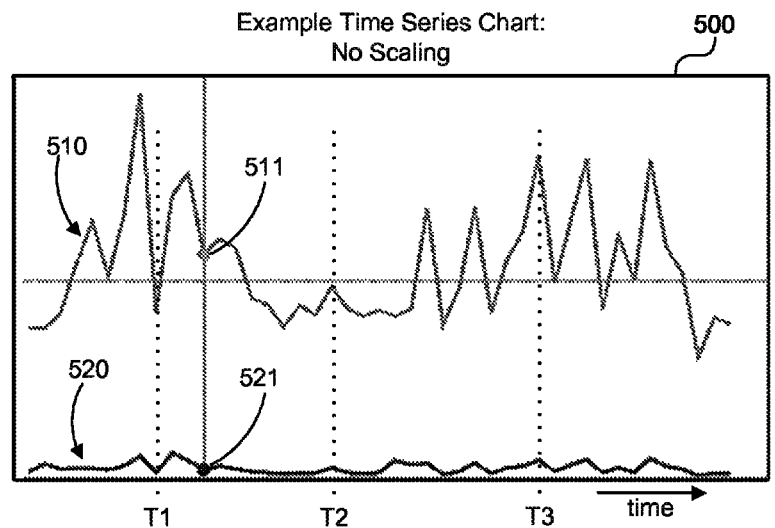
FIG. 5A is a chart of two example time-series datasets without scaling.

FIG. 5A is a chart 500 of two example time-series datasets without scaling. The chart 500 includes trend lines 510, 520 for two difference datasets plotted versus a common horizontal time axis. Both datasets are plotted using a common vertical axis, as the chart is plotted without scaling. As shown in FIG. 5A, the line 510 is shown entirely above the line 520, which spans a relatively small vertical extent of the chart area. Thus, the domains of the two datasets are entirely non-overlapping (i.e., the minimum value of line 510 is greater than the maximum value of line 520). The chart 500 also shows an example of individual values from the two datasets being studied at a common time point, which is shown in chart 500 by points 511, 521. However, in the unscaled chart 500, it may be difficult to visually discern the degree to which the trend lines 510, 520 correspond to one another. For example, at time T1, it appears that the two lines 510, 520 may both have a local minimum, and at time T3 it appears that the two lines 510, 520 may have a local maximum, but even discerning those relations may require a detailed study of the features of line 520, in part because of the vertical separation between the two lines and in part because line 520 spans such a small portion of the vertical extent of chart 520.

Figure 5B:
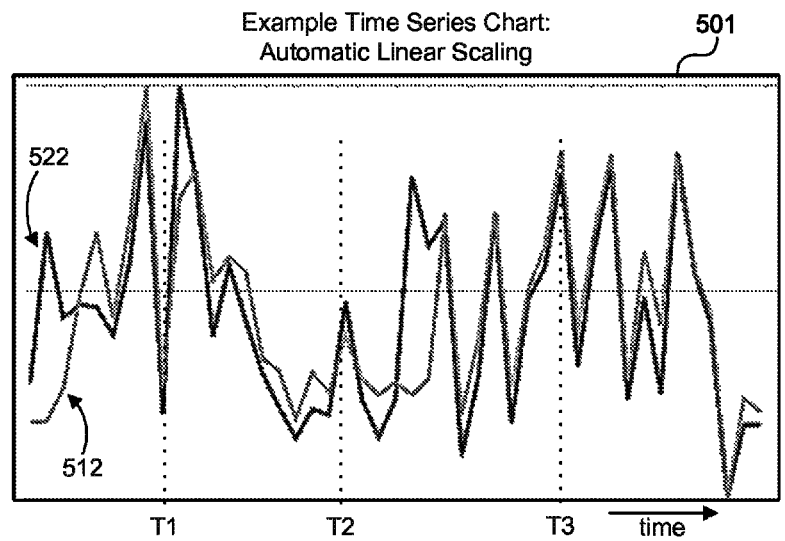
FIG. 5B is a chart of the two example time-series datasets in FIG. 5A with each dataset plotted with respect to separately scaled linear axes.

FIG. 5B is a chart 501 of the two example time-series datasets in FIG. 5A with each dataset plotted with respect to separately scaled linear axes. The chart 501 thus provides an example of a chart that may be rendered in response to the chart scaling selector 226 selecting linear chart scalings for two datasets, as described in connection with block 434 of process 420. The chart includes trend lines 512 and 522, which correspond to trend lines 510 and 520, respectively. As in chart 500, the two datasets are plotted versus a common horizontal time axis. Each dataset may be plotted using a separate linearly scaled vertical axis. In particular, line 512 is plotted using a linearly scaled vertical axis that spans the domain of that dataset. Thus, the minimum value of line 512 is near the bottom of chart 501 and the maximum value of line 512 is near the top of chart 501. Similarly, line 522 is plotted using a linearly scaled vertical axis that spans the domain of that dataset. Thus, the minimum value of line 522 is near the bottom of chart 501 and the maximum value of line 522 is near the top of chart 501. As shown in FIG. 5B, the two trend lines 512, 522 occupy a common vertical extent of the chart area and are overlaid on one another, even though the actual domains of the values in both datasets may be entirely non-overlapping. In the scaled format, the degree of correspondence between the two lines 512, 522 may be readily discernible as the local minima and maxima of the two trend lines 512, 522 may be overlaid on one another despite offsets and/or multiplicative factors between the two sets of values. Thus, the alignment of the trend lines 512, 522 at times T1, T2, and T3 may be more intuitively discerned by a user viewing the chart 501 as compared to the chart 500.

Figure 6A:
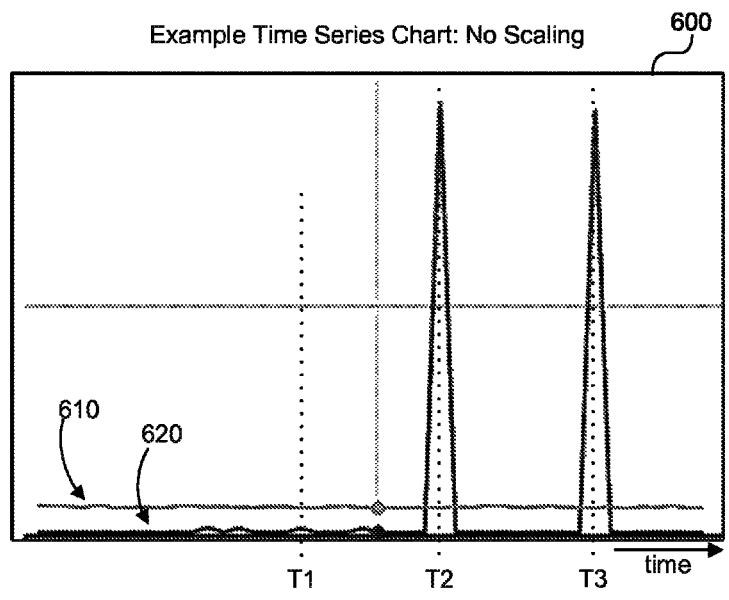
FIG. 6A is a chart of two example time-series datasets without scaling.

FIG. 6A is a chart 600 of two example time-series datasets without scaling. The chart 600 includes trend lines 610, 620 for two difference datasets plotted versus a common horizontal time axis. Both datasets are plotted using a common vertical axis, as the chart is plotted without scaling. As shown in FIG. 6A, the line 610 spans a relatively small vertical extent of the chart area, and appears nearly flat. In addition, the line 620 appears nearly flat aside from two maximum values at times T2 and T3. As a consequence, any trends/features in line 610 and much of line 620 may be difficult to discern using chart 600.

Figure 6B:
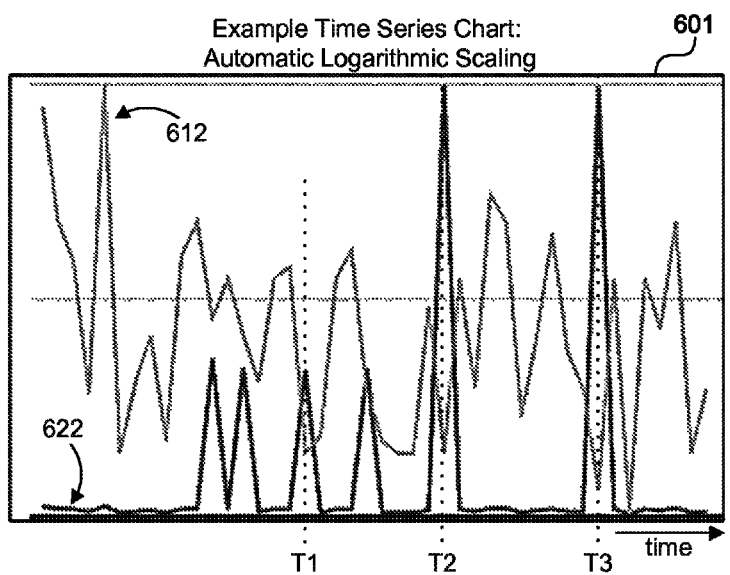
FIG. 6B is a chart of the two example time-series datasets in FIG. 6A with one dataset plotted with respect to a linear axis, and the other plotted with respect to a logarithmic axis.

FIG. 6B is a chart 601 of the two example time-series datasets in FIG. 6A with one dataset plotted with respect to a linear axis, and the other plotted with respect to a logarithmic axis. The chart 601 thus provides an example of a chart that may be rendered in response to the chart scaling selector 226 selecting linear chart scalings for two datasets, as described in connection with block 436 of process 420. The chart includes trend lines 612 and 622, which correspond to trend lines 610 and 620, respectively. As in chart 600, the two datasets are plotted versus a common horizontal time axis. However, line 612 may be plotted using a linearly scaled vertical axis that spans the domain of the dataset for line 612; and line 622 may be plotted using a logarithmically scaled vertical axis. Due to the logarithmic chart scaling, some features of the dataset for line 622 are more readily visually discernible in chart 601 than in chart 600. Moreover, as shown in FIG. 6B, the two trend lines 612, 622 occupy a common vertical extent of the chart area and are overlaid on one another. In the scaled format, the degree of correspondence between the two lines 612, 622 may be readily discernible as the local minima and maxima of the two trend lines 612, 622 are apparent. In particular, in the example shown in FIG. 6B, the chart 601 reveals that the local maxima of trend line 620, at times T1, T2, T3 each correspond to local minima of the trend line 612. Aside from those times, however, a pattern of correspondence between the two trend lines 612, 622 may not be evident. For example, an analyst viewing chart 601 may be able to more confidently conclude that the two datasets are not closely correlated to one another than the analyst could conclude based on viewing chart 600.

In FIGS. 5B and 6B, the plots for two different datasets are represented by differently colored trend lines. In some examples, however, plots for two different datasets may be represented by other visual cues, such as symbols, patterned lines, etc.

Some examples presented herein facilitate intuitive visual analysis of time-series datasets by automatically presenting charts of those time-series datasets with a scaling that makes features/trends of those datasets more readily visually discernible and comparable to a user. The selection of chart scalings may be based on the order-of-magnitudes spanned by the values in each dataset as well as the distribution of values in those datasets.

Figure 7:
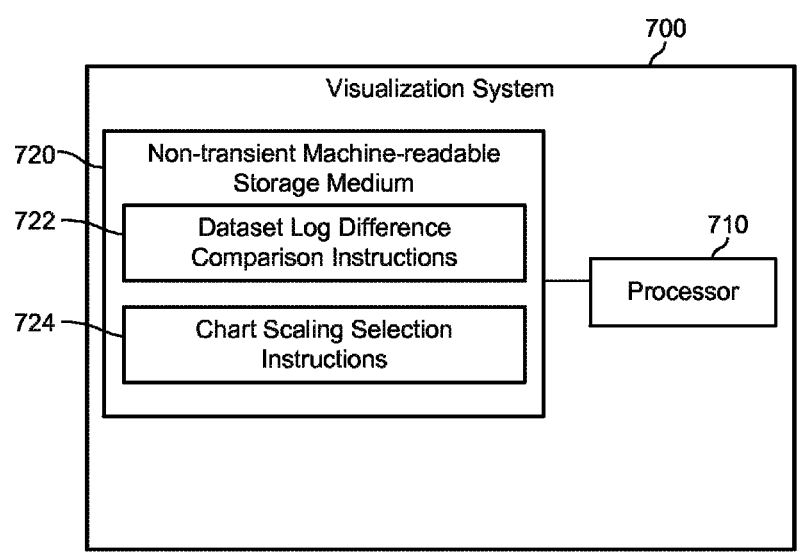
FIG. 7 is a block diagram of an example system in which a user can analyze time-series data.

FIG. 7 is a block diagram of an example system 700 for aligning time-series datasets. System 700 may be similar to system 220 described in connection with FIGS. 2-4, for example. In FIG. 7, system 700 includes a processor 710 and a non-transitory machine-readable storage medium 720. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 710 may incorporate central processing units (CPUs), microprocessors, and/or other hardware devices suitable for retrieval and execution of instructions stored in non-transitory machine-readable storage medium 720. In the particular example shown in FIG. 7, processor 710 may fetch, decode, and execute instructions 722, 724. In some examples, processor 710 may include electronic circuits having electronic components for performing the processes specified by the instructions in machine-readable storage medium 720. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. In some examples, machine-readable storage medium 720 may be a portable, external or remote storage medium, for example, that allows system 700 to download the instructions from the portable/external/remote storage medium. In this situation, the executable instructions may be part of an "installation package". As described herein, machine-readable storage medium 720 may be encoded with executable instructions for receiving two time-series datasets, determining a logarithmic difference between minimum and maximum values in each, and selecting between a logarithmic and linear chart scaling for each dataset based on the logarithmic differences.

Referring to FIG. 7, dataset log difference comparison instructions 722, when executed by a processor (e.g., 710), may cause system 700 to determine a difference between logarithms of respective maximum and minimum values of two time-series datasets. Chart scaling selection instructions 724, when executed by a processor (e.g., 710), may cause system 700 to select between a linear chart scaling and a logarithmic chart scaling based at least in part on the log differences. For instance, a log difference above a threshold with a threshold proportion of values distributed near either the minimum or maximum or a threshold-difference between the two log differences may result in selecting a logarithmic chart scaling for the dataset with the greater log difference and a linear scaling for the other.

The invention claimed is:

1. A computer-implemented method of monitoring system components, comprising:
   receiving a first dataset and a second dataset;
   determining a first log difference between a logarithm of a maximum value of the first dataset and a logarithm of a minimum value of the first dataset;
   determining a second log difference between a logarithm of a maximum value of the second dataset and a logarithm of a minimum value of the second dataset;
   selecting, based at least in part on the first and second log differences, between a linear chart scaling and a logarithmic chart scaling for the first dataset, wherein selecting between the linear and logarithmic chart scalings for the first dataset comprises:
      comparing the first log difference and the second log difference with a threshold,
      determining a first indicator of a distribution of values in the first dataset,
      determining a second indicator of a distribution of values in the second dataset, and
      selecting between the linear and logarithmic chart scalings based on the comparisons and based on the first and second indicators;
   selecting, based at least in part on the first and second log differences, between a linear chart scaling and a logarithmic chart scaling for the second dataset; and
   causing a user interface to display a chart in which the first dataset is plotted using the selected chart scaling for the first dataset and in which the second dataset is plotted using the selected chart scaling for the second dataset.

2. The method of claim 1, wherein determining the first indicator of the distribution of values in the first dataset comprises:
   determining a first fraction of values in the first dataset between the minimum value of the first dataset and a minimum threshold;
   determining a second fraction of values in the first dataset between the maximum value of the first dataset and a maximum threshold; and
   wherein the first indicator of the distribution of values in the first dataset comprises an indication of whether the first fraction or the second fraction exceeds a distribution threshold.

3. The method of claim 1, wherein the values of the first dataset are associated with respective time stamps, and wherein the values of the second dataset are associated with respective time stamps.

4. The method of claim 3, wherein causing the user interface to display the chart comprises causing the user interface to display the chart in which the values of the first dataset and the values of the second dataset are each plotted versus their associated time stamps in a common chart area.

5. The method of claim 1, wherein the chart is within a chart area having a vertical height and a horizontal width, and wherein the first dataset and the second dataset are plotted using respective vertical axes that at least partially overlap within the vertical height and using a common horizontal axis within the horizontal width.

6. A system of monitoring system components, comprising:
   data storage to store a first dataset and a second dataset;
   a user interface; and
   a processing system comprising a hardware processor communicatively coupled to the data storage and the user interface, wherein the processing system comprising the hardware processor is to:
      determine a first log difference between a logarithm of a maximum value of the first dataset and a logarithm of a minimum value of the first dataset;
      determine a second log difference between a logarithm of a maximum value of the second dataset and a logarithm of a minimum value of the second dataset;
      select, based at least in part on the first and second log differences, between a linear chart scaling and a logarithmic chart scaling for the first dataset, wherein selecting between the linear and logarithmic chart scalings for the first dataset comprises:
         comparing the first log difference and the second log difference with a threshold,
         determining a first indicator of a distribution of values in the first dataset,
         determining a second indicator of a distribution of values in the second dataset, and
         selecting between the linear and logarithmic chart scalings based on the comparisons and based on the first and second indicators;

select, based at least in part on the first and second log differences, between a linear chart scaling and a logarithmic chart scaling for the second dataset; and cause the user interface to display a chart in which the values of the first dataset and the values of the second dataset are each plotted versus a common horizontal axis, in which the first dataset is plotted using the selected chart scaling for the first dataset, and in which the second dataset is plotted using the selected chart scaling for the second dataset.

7. The system of claim 6, wherein the values of the first dataset are associated with respective time stamps, and wherein the values of the second dataset are associated with respective time stamps, and wherein the chart plots the values of the first dataset and the values of the second dataset versus their associated time stamps in a common chart area.

8. The system of claim 6, wherein the chart is within a chart area having a vertical height and a horizontal width, and wherein the first dataset and the second dataset are plotted using respective vertical axes that at least partially overlap within the vertical height and using a common horizontal axis within the horizontal width.

9. A non-transitory machine-readable storage medium encoded with instructions for monitoring system components, the instructions executable by a processor of a system to cause the system to:

receive a first dataset and a second dataset;

determine a first log difference between a logarithm of a maximum value of the first dataset and a logarithm of a minimum value of the first dataset;

determine a second log difference between a logarithm of a maximum value of the second dataset and a logarithm of a minimum value of the second dataset;

select, based at least in part on the first and second log differences, between a linear chart scaling and a logarithmic chart scaling for the first dataset, wherein selecting between the linear and logarithmic chart scalings for the first dataset comprises:

comparing the first log difference and the second log difference with a threshold, determining a first indicator of a distribution of values in the first dataset, determining a second indicator of a distribution of values in the second dataset, and selecting between the linear and logarithmic chart scalings based on the comparisons and based on the first and second indicators; and select, based at least in part on the first and second log differences, between a linear chart scaling and a logarithmic chart scaling for the second dataset; and cause a user interface to display a chart in which the first dataset is plotted using the selected chart scaling for the first dataset and in which the second dataset is plotted using the selected chart scaling for the second dataset.

* * * * *